(12) United States Patent
Shin et al.

(10) Patent No.: US 11,594,722 B2
(45) Date of Patent: Feb. 28, 2023

(54) NEGATIVE ACTIVE MATERIAL FOR RECHARGEABLE LITHIUM BATTERY, AND RECHARGEABLE LITHIUM BATTERY INCLUDING SAME

(71) Applicants: SAMSUNG SDI CO., LTD., Yongin-si (KR); Research & Business Foundation SUNGKYUNKWAN UNIVERSITY, Suwon-si (KR)

(72) Inventors: Changsu Shin, Yongin-si (KR); Jaehou Nah, Yongin-si (KR); Myeong Gyun Nam, Yongin-si (KR); Pil Jin Yoo, Yongin-si (KR); Gwan Hyun Choi, Yongin-si (KR)

(73) Assignees: SAMSUNG SDI CO., LTD., Yongin-si (KR); Research & Business Foundation SUNGKYUNKWAN UNIVERSITY, Suwon (KR)

( * ) Notice: Subject to any disclaimer, the term of this patent is extended or adjusted under 35 U.S.C. 154(b) by 193 days.

(21) Appl. No.: 17/091,181

(22) Filed: Nov. 6, 2020

(65) Prior Publication Data
US 2021/0151745 A1    May 20, 2021

(30) Foreign Application Priority Data
Nov. 19, 2019    (KR) .................. 10-2019-0148722

(51) Int. Cl.
*H01M 4/36* (2006.01)
*H01M 10/0525* (2010.01)
*H01M 4/62* (2006.01)
*H01M 4/38* (2006.01)
*H01M 4/02* (2006.01)

(52) U.S. Cl.
CPC .......... *H01M 4/364* (2013.01); *H01M 4/366* (2013.01); *H01M 4/386* (2013.01); *H01M 4/387* (2013.01); *H01M 4/625* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2009/0269669 A1 | 10/2009 | Kim et al. | |
| 2010/0136432 A1 | 6/2010 | Kim | |
| 2015/0243969 A1* | 8/2015 | Ku | H01M 4/1393 429/231.5 |
| 2017/0162868 A1* | 6/2017 | Kim | H01M 4/625 |
| 2019/0312264 A1* | 10/2019 | Shin | H01M 4/587 |

FOREIGN PATENT DOCUMENTS

| | | |
|---|---|---|
| KR | 10-2009-0090033 A | 8/2009 |
| KR | 10-2009-0109225 A | 10/2009 |
| KR | 10-2009-0114130 A | 11/2009 |
| KR | 10-2010-0062083 A | 6/2010 |

* cited by examiner

*Primary Examiner* — Zhongqing Wei
(74) *Attorney, Agent, or Firm* — Lee IP Law, P.C.

(57) ABSTRACT

A negative active material for a rechargeable lithium battery and a rechargeable lithium battery, the negative active material including a composite including silicon particles, metal particles, and a first amorphous carbon; and a second amorphous carbon surrounding on the composite.

15 Claims, 7 Drawing Sheets

NEGATIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2019-0148722, filed on Nov. 19, 2019, in the Korean Intellectual Property Office, and entitled: "Negative Active Material for Rechargeable Lithium Battery, and Rechargeable Lithium Battery Including Same," is incorporated by reference herein in its entirety.

BACKGROUND OF THE INVENTION

1. Field

Embodiments relate to a negative active material for a rechargeable lithium battery and a rechargeable lithium battery.

2. Description of the Related Art

A rechargeable lithium battery has recently drawn attention as a power source for small portable electronic devices. The rechargeable lithium battery uses an organic electrolyte solution and may have two or more a discharge voltage than a battery using an alkali aqueous solution, and accordingly, may have high energy density.

As a positive active material of a rechargeable lithium battery, a lithium-transition metal oxide having a structure capable of intercalating lithium ions, such as $LiCoO_2$, $LiMn_2O_4$, $LiNi_{1-x}Co_xO_2$ (0<x<1), and the like may be used.

As a negative active material, various carbon negative active materials such as artificial graphite, natural graphite, hard carbon, and the like may be used.

The above information disclosed in this Background section is only for enhancement of understanding of the background of the invention, and therefore it may contain information that does not form the prior art that is already known in this country to a person of ordinary skill in the art.

SUMMARY

The embodiments may be realized by providing a negative active material for a rechargeable lithium battery, the negative active material including a composite including silicon particles, metal particles, and a first amorphous carbon; and a second amorphous carbon surrounding on the composite.

The metal particles may be on a surface of the silicon particles.

The composite may include the metal particles positioned on a surface of the silicon particles, and the first amorphous carbon surrounding the silicon particles and the metal particles.

The metal particles may include Ni, Ti, Sn, or a combination thereof.

The silicon particles may have a rod shape, a flake shape, or a spherical shape.

The silicon particles may have a rod shape or a flake shape, and the silicon particles may have an aspect ratio of about 5 to about 20.

The silicon particles may have a spherical shape, and the silicon particles may have a particle diameter of about 5 nm to about 300 nm.

The metal particles may have a spherical shape.

The metal particles may have a particle diameter of about 1 nm to about 20 nm.

The second amorphous carbon may be a continuous layer on the surface of the composite.

The first amorphous carbon may be a hard carbon, and the second amorphous carbon may be a soft carbon.

The metal particles may be directly on the surface of the composite.

The embodiments may be realized by providing a rechargeable lithium battery including a negative electrode including the negative active material according to an embodiment; a positive electrode; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
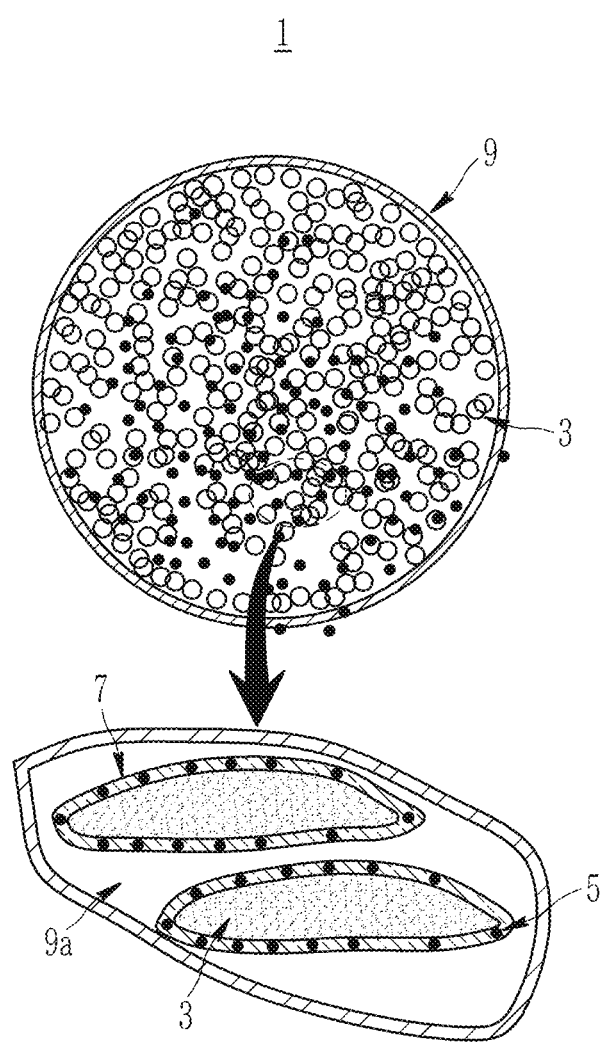
FIG. 1 is a schematic view of a structure of the negative active material according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

A negative active material for a rechargeable lithium battery according to one embodiment may include, e.g., a composite (including silicon particles, metal particles, and a first amorphous carbon); and a second amorphous carbon surrounding a surface of the composite. The composite may include a mixture of silicon particles, metal particles, and a first amorphous carbon.

In an implementation, the first amorphous carbon may be hard carbon derived from, e.g., tannic acid, gallic acid, dopamine, pyrogallol acid, or a combination thereof, and the second amorphous carbon may be soft carbon derived from pitch, e.g., petroleum pitch, coal pitch, or a combination thereof. In an implementation, the first amorphous carbon and the second amorphous carbon may be an amorphous carbon finally prepared, having similar physical properties, regardless of preparing the amorphous carbon from the compound or the pitches. In an implementation, the first amorphous carbon may be different from the second amorphous carbon.

In an implementation, the metal particles may be positioned on the surface of the silicon particles. In an implementation, the metal particles may directly contact the surface of the silicon particles, e.g., may be supported on the surface of the silicon particles, or the metal particles may be within a predetermined distance from the surface of the silicon particles.

In an implementation, the composite may include the metal particles on the surface of the silicon particles, and the first amorphous carbon surrounding the silicon particles and the metal particles. As described above, regardless of the positioning type or location of the metal particles on the surface of the silicon particles, when the metal particles are on the surface of the silicon particles, the metal particles may be included in the amorphous carbon surrounding the surface of the silicon particles, which may help improve the strength of the composite including the silicon particles and the first amorphous carbon and the electrical conductivity, resulting in the improvement of the cycle-life characteristics.

When the first amorphous carbon is included in the composite, e.g., surrounding the silicon particles and the metal particles, the electrical conductivity may be improved and the strength may be maintained.

An amount of the first amorphous carbon may be about 1 wt % to about 20 wt % based on the total 100 wt % of the negative active material for the rechargeable lithium battery, e.g., may be about 10 wt % to about 20 wt %, based on the total 100 wt % of the negative active material for the rechargeable lithium battery. When the amount of the first amorphous carbon is within the above range, it may surround on the silicon particles and the metal particles well, and facilitates distribution of the metal particles in the composite, and thus, the effects from the inclusion of the amorphous carbon may be more improved.

The silicon particles may have a rod shape, a flake shape, or a spherical shape. In an implementation, if the silicon particles have a rod shape or a flake shape, the silicon particles may have an aspect ratio (long axis/short axis) of about 5 to about 20. When the aspect ratio of the silicon particles satisfies the above range, the long cycle-life characteristics of the battery including the active material may be realized, and the volume expansion of the active material during the charge and the discharge may be effectively suppressed. In an implementation, if the silicon particles have a rod shape or a flake shape, the size may be about 5 nm to about 300 nm. When the size of the silicon particles is within the above range, the long cycle-life characteristic of the battery including the active material may be provided and the volume expansion of the active material during the charge and the discharge may be effectively suppressed.

When the silicon particles have a spherical shape, the silicon particles may have a particle diameter of, e.g., about 5 nm to about 300 nm. When the particle diameter of the silicon particles is within the above range, the long cycle-life characteristic of the battery including the active material may be provided and the volume expansion of the active material during the charge and discharge may be effectively suppressed.

When the Si nanoparticles may be of a flake type, the particle diameter may be a length of the long axis. Herein, the particle diameter refers to an average particle diameter, and the average particle diameter may be a particle diameter D50 which is measured by cumulative volume. Such a particle diameter D50 indicates an average particle diameter D50 where a cumulative volume is about 50 volume % in a particle distribution, when a definition is not otherwise provided.

The average particle diameter D50 may be measured by a suitable technique, e.g., using a particle size analyzer, transmission electron microscope photography, or scanning electron microscope photography. Another method may be performed by measuring it using a measuring device with dynamic light scattering, analyzing data to count a number of particles relative to each particle size, and then calculating to obtain an average particle diameter D50.

An amount of the silicon particles may be about 20 wt % to about 80 wt %, e.g., about 40 wt % to about 70 wt %, based on the total weight, 100 wt %, of the negative active material for a rechargeable lithium battery. When the amount of the silicon particles is within the range, the capacity of the battery including the negative active material may be improved and the long cycle-life characteristic may be exhibited.

The metal particles may be, e.g., Ni, Ti, Sn, or a combination thereof. In an implementation, the metal particles may include non-compounded Ni, Ti, or Sn particles. In an implementation, the metal particles may include particles of an alloy of two or three of Ni, Ti, and Sn. Such metal particles may have a spherical shape, and herein, a particle diameter may be about 1 nm to about 20 nm, e.g., about 1 nm to about 10 nm. When the particle diameter of the metal particles is within the above range, the resistance of the negative active material may be reduced and the rate capability of the battery including the active material may be improved.

An amount of the metal particles may be about 2 wt % to about 32 wt %, based on the total weight, 100 wt %, of the negative active material for the rechargeable lithium battery, e.g., about 2 wt % to about 10 wt %, based on the total weight, 100 wt %, of the negative active material for the rechargeable lithium battery. When the amount of the metal particles is within the above range, the resistance of the active material may be reduced, and high capacity may be exhibited.

The second amorphous carbon may be continuously positioned on the surface of the composite as a layer (e.g., completely or incompletely covering the surface of the composite), or may be discontinuously positioned on the surface of the composite as an island type.

An amount of the second amorphous carbon may be about 5 wt % to about 40 wt %, based on the total weight, 100 wt %, of the negative active material for the rechargeable lithium battery, e.g., about 10 wt % to about 30 wt %, based on the total weight, 100 wt %, of the negative active material for the rechargeable lithium battery. When the amount of the second amorphous carbon is within the range, the long cycle-life characteristics may be exhibited and the irreversible capacity of the battery including the active material during the charge and the discharge may be deteriorated.

FIG. 1 schematically shows a structure of the negative active material for the rechargeable lithium battery according to one embodiment. As shown in FIG. 1, the negative active material 1 may include a composite including silicon particles 3, metal particles 5, and a first amorphous carbon 7, and a second amorphous carbon 9 surrounding the composite. In an implementation, the composite may include the silicon particles 3, the metal particles 5 on the surface of the silicon particles 3, and the first amorphous carbon 7 surrounding the silicon particles 3 and the metal particles 5. In an implementation, as shown in FIG. 1, a portion 9a of the second amorphous carbon 9 may also be filled between the composites. In an implementation, as illustrated in FIG. 1, the metal particles 5 may be on (e.g., directly on) the surface of the silicon particle 3. In an implementation, the metal particles 5 and the silicon particles 3 may also be positioned within a predetermined distance (e.g., spaced apart) in the region in which the metal particles 5 and the silicon particles 3 are surrounded with the first amorphous carbon 7 (e.g., such that a part of the first amorphous carbon 7 is between the metal particles 5 and the surface of the silicon particles 3). In an implementation, as illustrated in FIG. 1, the second amorphous carbon 9 may be continuously positioned on the surface of the composite as a layer (e.g., completely covering the surface of the composite). In an implementation, it may be discontinuously positioned on the surface of the composite as an island.

Figure 2:
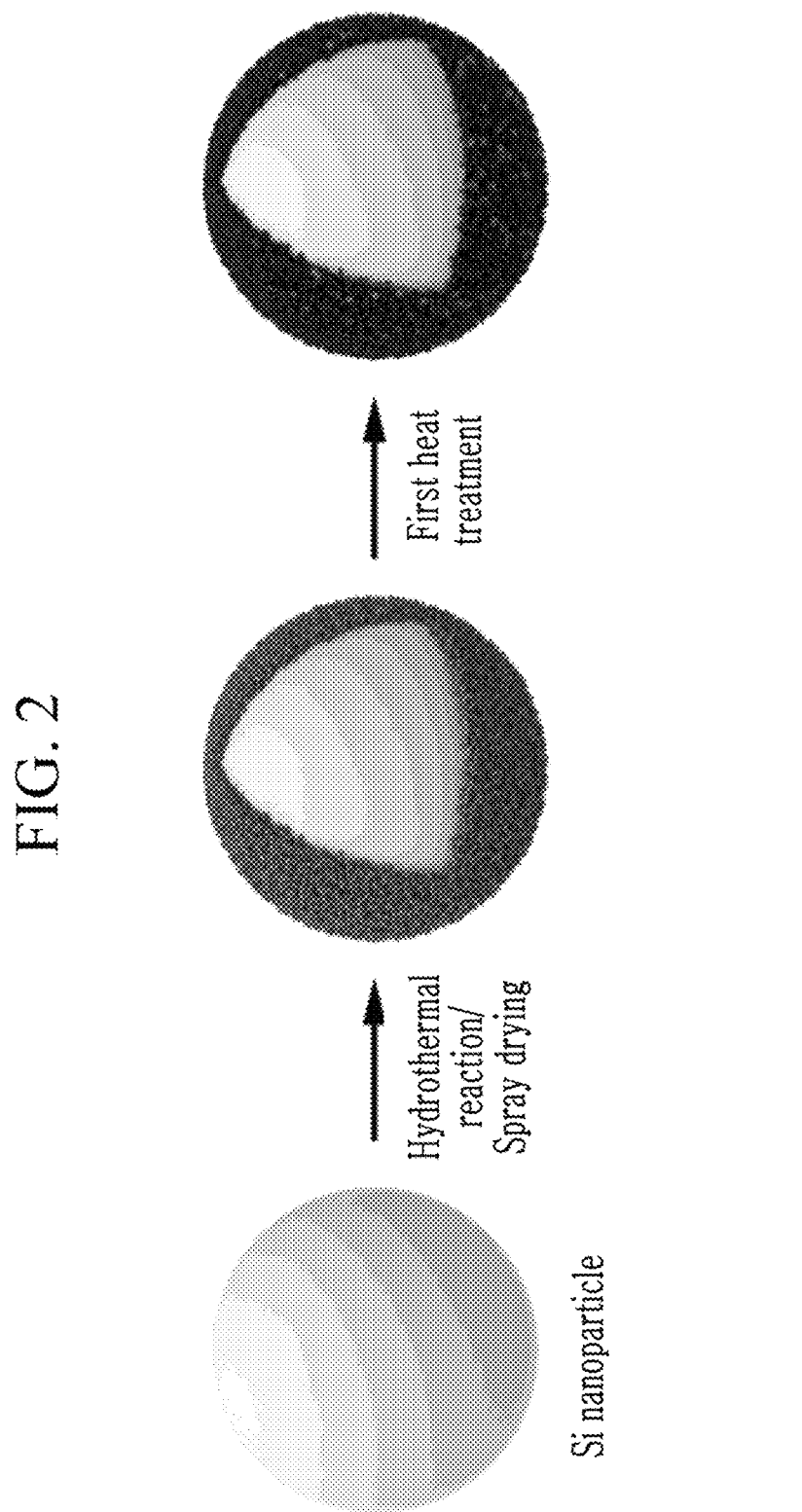
FIG. 2 schematically shows a process for preparing the negative active material according to an embodiment.

A negative active material preparation according to one embodiment will be illustrated based on FIG. 2, as below.

First, silicon particles may be prepared. The silicon particles may be nanoparticles, e.g., may be nanoparticles with a particle diameter of about 10 nm to about 200 nm. Such silicon nanoparticles may be obtained by a suitable nanoparticle preparation such as a top-down technique, e.g., pulverization, or a bottom-up technique in which atoms are agglomerated using a Si organic gas such as $SiH_4$, and the like, e.g., chemical vapor deposition (CVD). The pulverization may include ball milling.

The silicon particles may have a rod shape, a flake shape, or a spherical shape.

The silicon particles, a first amorphous carbon precursor, and a metal compound may be mixed to prepare a mixture. The first amorphous carbon precursor may include, e.g., tannic acid, gallic acid, dopamine, pyrogallol acid, or a combination thereof. The metal compound may be a compound including, e.g., Ni, Ti, Sn, or a combination thereof, compounded as a chloride, hydroxide, or nitride.

During the mixing, a bonding layer of the metal in the metal compound and the first amorphous carbon may be formed.

A mixing ratio of the silicon particles, the first amorphous carbon precursor, and the metal compound may be about 50:30:50 to about 50:30:28 by weight (e.g., in terms of parts by weight). When the mixing ratio of the silicon particles, the first amorphous carbon precursor, and the metal compound is within in the above range, a side reactant, such as $Ni_2Si$, which could be generated due to the reaction of the silicon particles and the metal compound, may be effectively prevented.

The mixing may be performed by a wet process using a solvent, or a dry process using no solvent. The solvent may include, e.g., isopropanol, ethanol, propanol, butanol, or a combination thereof.

The resulting mixture may be hydrothermally reacted. The hydrothermal reaction may be performed at about 80° C. to about 150° C. In an implementation, the hydrothermal reaction may be performed by inserting a microwave reactor of an autoclave type and injecting, exposing, or otherwise providing microwave electromagnetic waves, e.g., ultrahigh frequency (UHF) waves. In an implementation, the microwave electromagnetic waves may be provided in the range of about 300 W to about 1,600 W, and the hydrothermal reaction may be controlled at a temperature range of about 80° C. to about 150° C., e.g., about 100° C. to about 120° C.

According to the hydrothermal reaction, the first amorphous carbon may react with the metal compound to prepare a reaction product. Thereafter, the reaction product may be spray dried to prepare a spray dried product. The spray drying may be performed at about 80° C. to about 170° C., e.g., at about 120° C. to about 150° C. In case of performing the spray drying in the temperature range, the solvent may be effectively dried and a dense spray dried product may be prepared.

The obtained spray dried product may firstly be first heat treated to prepare a composite. The first heat treatment may be performed at about 300° C. to about 600° C., e.g., at about 400° C. to about 500° C. When the first heat treatment is performed in the temperature range, it may be advantageous in removal of organic materials and to generate a metal. The first heat treatment may be performed under an inert atmosphere such as argon (Ar), a mixed atmosphere of argon (Ar) and $H_2$ gas, an atmosphere of $N_2$ gas, or the like. According to the first heat treatment, the first amorphous carbon precursor may form a first amorphous carbon which may be included in the composite as a first amorphous carbon.

The prepared composite may be mixed with a second amorphous carbon and then the resulting mixture may be secondarily heat treated to prepare a negative active material. The second amorphous carbon precursor may include, e.g., petroleum pitch, coal pitch, or a combination thereof. A mixing ratio of the composite and the second amorphous carbon precursor may be about 60:40 to about 90:10 by weight, or may be about 80:20 to about 90:10 by weight. When the mixing ratio of the composite and the second amorphous carbon is within the range, high capacity and long cycle-life characteristics may be obtained.

The secondary heat treatment may be performed at about 600° C. to about 1,100° C., e.g., at about 900° C. to about 1,000° C. When the secondary heat treatment is performed in the temperature range, the electrical resistance of the active material may be effectively decreased, and the charge and discharge efficiency may be improved. According to the secondary heat treatment, the second amorphous carbon precursor may form a second amorphous carbon which may be present on a surface of the composite as a second amorphous carbon.

According to one embodiment, a rechargeable lithium battery including a negative electrode, a positive electrode, and an electrolyte is provided.

The negative electrode may include a current collector and a negative active material layer on the current collector, and the negative active material may include the negative active material according to one embodiment.

The negative active material layer may further include a carbon negative active material. Exemplary of the carbon negative active material may include a crystalline carbon, an amorphous carbon, or a combination thereof. The crystalline carbon may be natural graphite or artificial graphite such as with an unspecified shape, a sheet shape, a flake shape, a spherical shape, or a fiber shape, and the amorphous carbon may be soft carbon, hard carbon, mesophase pitch carbide, sintered cokes, or the like.

In the negative active material layer, the negative active material may be included in an amount of 95 wt % to 99 wt %, based on the total weight of the negative active material layer. If the negative active material layer includes both the negative active material according to one embodiment, e.g., a silicon negative active material, and the carbon negative active material, a mixing ratio of the silicon-based negative active material to the carbon based negative active material may be about 20:80 to 10:90 by weight. When the mixing ratio of the silicon-based negative active material and the carbon-based negative active material is within the range, the long cycle-life characteristics and the volume expansion inhibition may be obtained.

The negative active material layer may include a binder, and may further optionally include a conductive material. In the negative active material layer, an amount of the binder may be about 1 wt % to about 5 wt %. based on the total weight of the negative active material layer. When the negative active material layer further includes a conductive material, the negative active material layer may include, e.g., about 90 wt % to about 98 wt % of the negative active material, about 1 wt % to about 5 wt % of the binder, and about 1 wt % to about 5 wt % of the conductive material.

The binder may help adhere negative active material particles to each other well and may also adhere negative active materials to the current collector. The binder may include, e.g., a non-water-soluble binder, a water-soluble binder, or a combination thereof.

The non-water-soluble binder may include, e.g., polyvinyl chloride, carboxylated polyvinylchloride, polyvinylfluoride, an ethylene oxide-included polymer, polyvinyl pyrrolidone, polyurethane, polytetrafluoroethylene, polyvinylidene fluoride, polyethylene, polypropylene, polyamideimide, polyimide, lithium polyacrylate, or a combination thereof.

The water-soluble binder may include, e.g., a styrene-butadiene rubber, an acrylated styrene-butadiene rubber, an acrylonitrile-butadiene rubber, an acryl rubber, a butyl rubber, a fluorine rubber, an ethylene propylene copolymer, polyepichlorohydrin, polyphosphazene, polyacrylonitrile, polystyrene, ethylene propylene diene copolymer, polyvinylpyridine, chloro sulfonated polyethylene, latex, a polyester resin, an acryl resin, a phenol resin, an epoxy resin, polyvinyl alcohol, or a combination thereof.

When the water-soluble binder is used as a negative electrode binder, a cellulose-based compound may be further include to provide viscosity as a thickener. The cellulose-based compound may include, e.g., carboxymethyl cellulose, hydroxypropyl methyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material may be included to provide electrode conductivity, and a suitable electrically conductive material that does not cause a chemical change may be used. Examples of the conductive material may include, e.g., a carbon material such as natural graphite, artificial graphite, carbon black, acetylene black, ketjen black, denka black, a carbon fiber, or the like; a metal material of a metal powder or a metal fiber including copper, nickel, aluminum, silver, or the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, or a combination thereof.

The negative electrode may be prepared by mixing a negative active material, a binder, and optionally a conductive material in a solvent to prepare an active material composition, and coating the composition on a current collector. The solvent may be water.

The positive electrode may include a positive current collector and a positive active material layer formed on the positive current collector.

The positive active material may include compounds that reversibly intercalate and deintercalate lithium ions (lithiated intercalation compounds). In an implementation, it may include composite oxides of a metal selected from cobalt, manganese, nickel, and a combination thereof, and lithium. More specific examples may include compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2 PO_{45}$ ($0 \leq f \leq 2$); $Li_{(3-f)}Fe_2 PO_{43}$ ($0 \leq f \leq 2$); and $Li_aFePO_4$ ($0.90 \leq a \leq 1.8$).

In the chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include, e.g., spray coating, dipping, or the like.

In the positive electrode, an amount of the positive active material may be 90 wt % to 98 wt % based on the total weight of the positive active material layer.

In an implementation, the positive active material layer may further include a binder and a conductive material. Herein, each amount of the binder and the conductive material may be about 1 wt % to about 5 wt %, respectively, based on a total amount of the positive active material layer.

The binder may help improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause a chemical change in a battery may be used. Examples of the conductive material include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include, e.g., an aluminum foil, a nickel foil, or a combination thereof.

The positive electrode may be prepared mixing a positive active material, a binder, and optionally a conductive material in a solvent to prepare an active material composition and coating the active material composition on a current collector. The solvent may include, e.g., N-methyl pyrrolidone.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester solvent may include methyl acetate, ethyl acetate, n-propyl acetate, t-butyl acetate, methyl propionate, ethyl propionate, propylpropionate, γ-butyrolactone, decanolide, valerolactone, mevalonolactone, caprolactone, and the like. The ether solvent may include dibutyl ether, tetraglyme, diglyme, dimethoxyethane, 2-methyltetrahydrofuran, tetrahydrofuran, and the like. The ketone solvent may include cyclohexanone and the like. The alcohol solvent may include ethanol, isopropyl alcohol, and the like. The aprotic solvent may include nitriles such as R—CN (wherein R is a hydrocarbon group having a C2 to C20 linear, branched, or cyclic structure and may include a double bond, an aromatic ring, or an ether bond) and the like, dioxolanes such as 1,3-dioxolane and the like, and sulfolanes and the like.

The non-aqueous organic solvent may be used alone or in a mixture. When the organic solvent is used in a mixture, the mixture ratio may be controlled in accordance with a desirable battery performance.

The carbonate solvent may be a mixture of a cyclic carbonate and a chain carbonate. In this case, the cyclic carbonate and the chain carbonate may be mixed and used in a volume ratio of 1:1 to 1:9, such that the performance of the electrolyte may be improved.

When the non-aqueous organic solvent is used in a mixture, a mixed solvent of a cyclic carbonate and a chain carbonate; a mixed solvent of a cyclic carbonate and a propionate solvent; or a mixed solvent of a cyclic carbonate, a chain carbonate, and a propionate solvent may be used. The propionate solvent may include, e.g., methyl propionate, ethyl propionate, propyl propionate, or a combination thereof.

Herein, when the cyclic carbonate and the chain carbonate or the cyclic carbonate and the propionate solvent are mixed, they may be mixed in a volume ratio of about 1:1 to about 1:9, and performance of an electrolyte solution may be improved. In addition, when the cyclic carbonate, the chain carbonate, and the propionate solvent are mixed, they may be mixed in a volume ratio of about 1:1:1 to about 3:3:4. The mixing ratios of the solvents may be appropriately adjusted according to desirable properties.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of about 1:1 to about 30:1.

The aromatic hydrocarbon organic solvent may include an aromatic hydrocarbon compound of Chemical Formula 1.

[Chemical Formula 1]

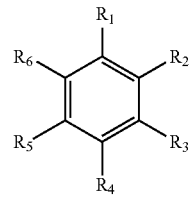

In Chemical Formula 1, $R_1$ to $R_6$ may be the same or different and may be selected from hydrogen, a halogen, a C1 to C10 alkyl group, a haloalkyl group, and a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 2 as an additive for improving the cycle-life of a battery.

[Chemical Formula 2]

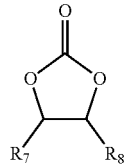

In Chemical Formula 2, $R_7$ and $R_8$ are the same or different and may be selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), or a fluorinated C1 to C5 alkyl group, and both of $R_7$ and $R_8$ are not hydrogen.

Examples of the ethylene carbonate compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within a suitable range.

The electrolyte may further include vinyl ethylene carbonate, propane sultone, succinonitrile, or a combination thereof, and the amount thereof may be suitably controlled.

The lithium salt dissolved in the organic solvent supplies lithium ions in a battery, enables a basic operation of a rechargeable lithium battery, and improves transportation of the lithium ions between positive and negative electrodes. Examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide LiFSI), $LiC_4F_9SO_3$, $LiClO_4$, $LiAlO_2$, $LiAlCl_4$, $LiPO_2F_2$, LiN $(C_xF_{2x+1}SO_2)(C_yF_{2y+1}SO_2)$ (wherein x and y are natural numbers, e.g., an integer of 0 to 20), lithium difluoro (bisoxalato) phosphate, LiCl, LiI, $LiB(C_2O_4)_2$ (lithium bis (oxalato) borate: LiBOB), and lithium difluoro(oxalato) borate (LiDFOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, a polypropylene/polyethylene/polypropylene triple-layered separator, and the like.

Figure 3:
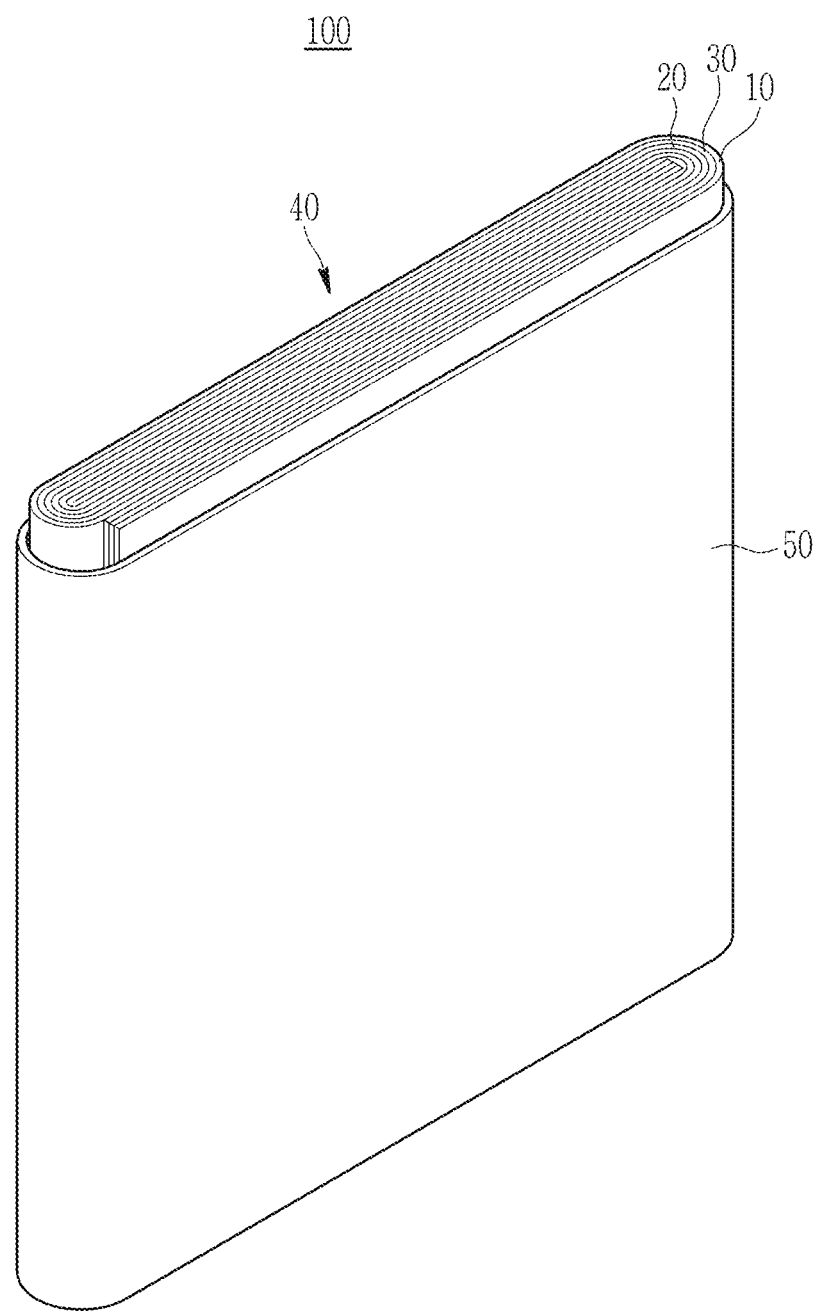
FIG. 3 is a schematic view of a structure of a rechargeable lithium battery according to one embodiment.

FIG. 3 is an exploded perspective view of a lithium secondary battery according to an embodiment. As illustrated in FIG. 3, the lithium secondary battery may be a prismatic battery. In an implementation, the lithium secondary battery may include variously-shaped batteries such as a cylindrical or pouch-type battery.

Referring to FIG. 3, a lithium secondary battery 100 according to an embodiment includes an electrode assembly 40 manufactured by winding a separator 30 between a positive electrode 10 and a negative electrode 20, and a case 50 housing the electrode assembly 40. The positive electrode 10, the negative electrode 20, and the separator 30 may be impregnated with an electrolyte solution.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Si particles were pulverized by ball milling to prepare Si particles having a size of 100 nm and a flake shape.

Figure 4:
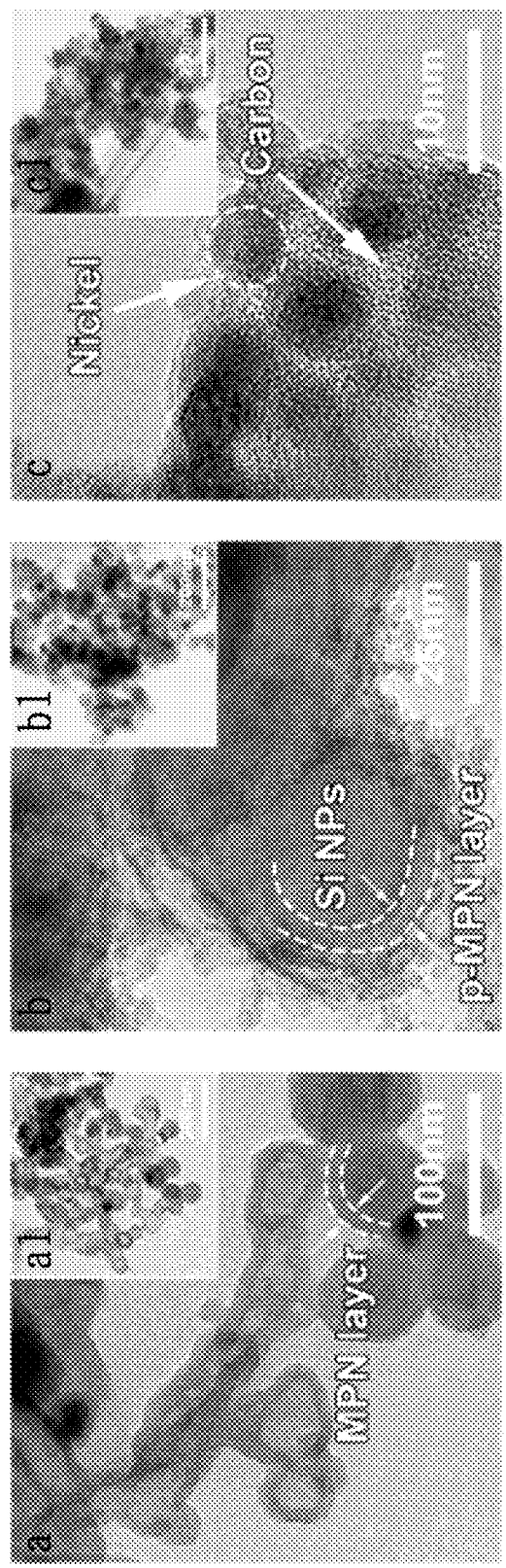
FIG. 4 shows TEM images of structures at each step during the preparation of the negative active material according to Example 1.

The prepared Si particles, tannic acid, and Ni chloride ($NiCl_2$) were added to an isopropanol solvent at a 50:30:28 weight ratio, mixed and dispersed to prepare a mixture. Regarding the mixture, a 75,000 times TEM image is shown in (a) of FIG. 4, and a 150,000 times TEM image, which is an enlargement of a part of (a), is shown in inset (a1) of FIG. 4. In a of FIG. 4, a MPN layer indicated a bonding layer of Ni and tannic acid.

The prepared mixture was added to a microwave reactor of an autoclave type and an ultrahigh frequency of 1,500 W was provided thereto to perform a hydrothermal reaction at 100° C. The obtained hydrothermal reaction product was spray dried at 120° C. using a spray dryer. Regarding the spray dried product, a 300,000 times TEM image is shown in (b) of FIG. 4, and a 600,000 times image, which is an enlargement of a part of (b), is shown in inset (b1) of FIG. 4. In (b) of FIG. 4, Si NPs indicates Si nanoparticles and a p-MPN layer indicates polymerized MPN.

The spray dried product was added to a furnace under a mixed atmosphere of Ar and $H_2$ (3:1 volume ratio) and was first heat treated at 450° C. to prepare a composite. A TEM image of the prepared composite is shown in (c) of FIG. 4 (500,000 times) and a 1,500,000 times image, which is an enlargement of a part of (c), is shown in inset (c1) of FIG. 4. 80 wt % of the prepared composite was mixed with 20 wt % of a petroleum pitch, and the resulting mixture was secondarily heat treated at 900° C. to prepare a negative active material.

The prepared negative active material included a composite including silicon particles, nickel particles on the surface of the silicon particles, and a first amorphous carbon surrounding the nickel particles. A second amorphous carbon surrounded the composite. The first amorphous carbon was hard carbon and the second amorphous carbon was soft carbon. The silicon particles had a size of 100 nm, had a flake shape, and an aspect ratio (long axis/short axis) of 5. The nickel particles had a spherical shape, and an average particle diameter D50 of 10 nm. The first amorphous carbon and the second amorphous carbon completely covered the surfaces of the nickel particles and the composite, respectively.

In the negative active material, the amount of the silicon particles was 60 wt % 1; the amount of the first amorphous carbon was 10 wt %; the amount of the nickel particles was 15 wt %; and the amount of the second amorphous carbon was 15 wt %, all wt % being based on the total weight, i.e., 100 wt %, of the negative active material.

85 wt % of the negative active material, 5 wt % of carbon black (trademark: Super-P) conductive material, and 10 wt % of a lithium polyacrylate binder were mixed in an N-methyl pyrrolidone solvent to prepare a negative active material slurry. The negative active material slurry was coated on a Cu current collector, dried, and compressed to prepare a negative electrode including a negative active material layer formed on the current collector.

Using the negative electrode, a lithium metal counter electrode, and an electrolyte, a coin-type half-cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

EXAMPLE 2

A negative active material was prepared by the same procedure as in Example 1, except that a mixing ratio of the prepared Si particles, tannic acid, and Ni chloride was changed to a 50:30:50 weight ratio. Using the negative active material, a negative electrode was prepared.

In the negative active material, the amount of the silicon particles was 50 wt %; the amount of the first amorphous carbon was 10 wt %; the amount of the nickel particles was 25 wt %; and the amount of the second amorphous carbon was 15 wt %, all wt % being based on the total weight, 100 wt %, of the negative active material.

Using the negative electrode, a coin-type half-cell was fabricated by the same procedure as in Example 1.

EXAMPLE 3

A negative active material was prepared by the same procedure as in Example 1, except that Sn chloride ($SnCl_2$) was used instead of using Ni chloride. Using the negative active material, a negative electrode was prepared.

COMPARATIVE EXAMPLE 1

Si particles were pulverized to prepare Si particles having a size of 100 nm and a spherical shape. An amorphous carbon layer was prepared on the surface of the prepared Si particles using chemical vapor deposition with an acetylene source to prepare a negative active material. Using the negative active material, a negative electrode was prepared.

Using the negative active material, a negative electrode was prepared by the same procedure as in Example 1.

COMPARATIVE EXAMPLE 2

Si particles were pulverized to prepare Si particles having a size of 50 nm and a spherical shape. The prepared Si particles were mixed with dopamine at a 1:2 weight ratio, and the mixture was heat treated at 900° C. under a $N_2$ atmosphere to prepare a negative active material including a Si core, and an amorphous carbon layer formed on the core. The amorphous carbon layer was hard carbon doped with N. Using the negative active material, a negative electrode was prepared by the same procedure as in Example 1.

Using the negative electrode, a coin-type half-cell was fabricated by the same procedure as in Example 1.

COMPARATIVE EXAMPLE 3

Si particles were pulverized to prepare Si particles having a size of 50 nm and a spherical shape. The prepared Si particles were mixed with petroleum pitch at a 1:2 weight ratio, and the mixture was heat treated at 900° C. under a $N_2$ atmosphere to prepare a negative active material including a Si core, and an amorphous carbon layer formed on the core. The amorphous carbon layer was hard carbon. Using the negative active material, a negative electrode was prepared by the same procedure as in Example 1.

Using the negative electrode, a coin-type half-cell was fabricated by the same procedure as in Example 1.

COMPARATIVE EXAMPLE 4

Si particles were pulverized to prepare Si particles having a size of 50 nm and a spherical shape. The prepared Si particles, tannic acid, and reduced graphene oxide were mixed at a weight ratio of 1:0.2:0.5, and the mixture was heat treated at 900° C. under a $N_2$ atmosphere to prepare a negative active material including a Si core and a coating layer formed on the core. The coating layer included a mixture of hard carbon and the reduced graphene oxide. Using the negative active material, a negative electrode was prepared by the same procedure as in Example 1.

Using the negative electrode, a coin-type half-cell was fabricated by the same procedure as in Example 1.

EXAMPLE 4

97 wt % of a negative active material of a mixture of the negative active material according to Example 1 and artificial graphite (mixing ratio: 9:91 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated. As the electrolyte, a 1.5 M $LiPF_6$ solution in a mixed solvent of ethylene carbonate, dimethyl carbonate and ethyl methyl carbonate (20:40:40 volume ratio) was used.

EXAMPLE 5

97 wt % of a negative active material of a mixture of the negative active material according to Example 2 and artificial graphite (mixing ratio: 13:87 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode and an electrolyte, a coin-type half-cell was fabricated by the same procedure as in Example 4.

EXAMPLE 6

97 wt % of a negative active material of a mixture of the negative active material according to Example 3 and artificial graphite (mixing ratio: 7:93 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated by the same procedure as in Example 4.

COMPARATIVE EXAMPLE 5

97 wt % of a negative active material of a mixture of the negative active material according to Comparative Example 1 and artificial graphite (mixing ratio: 9:91 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated by the same procedure as in Example 4.

COMPARATIVE EXAMPLE 6

97 wt % of the negative active material according to Comparative Example 2, 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated by the same procedure as in Example 4.

COMPARATIVE EXAMPLE 7

97 wt % of the negative active material according to Comparative Example 3, 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated by the same procedure as in Example 4.

COMPARATIVE EXAMPLE 8

97 wt % of the negative active material according to Comparative Example 4, 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

Using the negative electrode, a lithium metal counter electrode, and an electrolyte, a coin-type half-cell was fabricated by the same procedure as in Example 4.

1) Measurement of Impedance (Electrochemical Impedance Spectroscopy: EIS)

The half-cells were charged and discharged under a 0.7C, 4.4 V cut-off, and SOC100 condition to measure impedance according to an EIS (electrochemical impedance spectroscopy) method. Among these results, the results according to Examples 1 and 2 and Comparative Example 1 are shown in FIG. 5, and the results according to Example 1 and Comparative Examples 2 to 4 are shown in FIG. 6.

Figure 5:
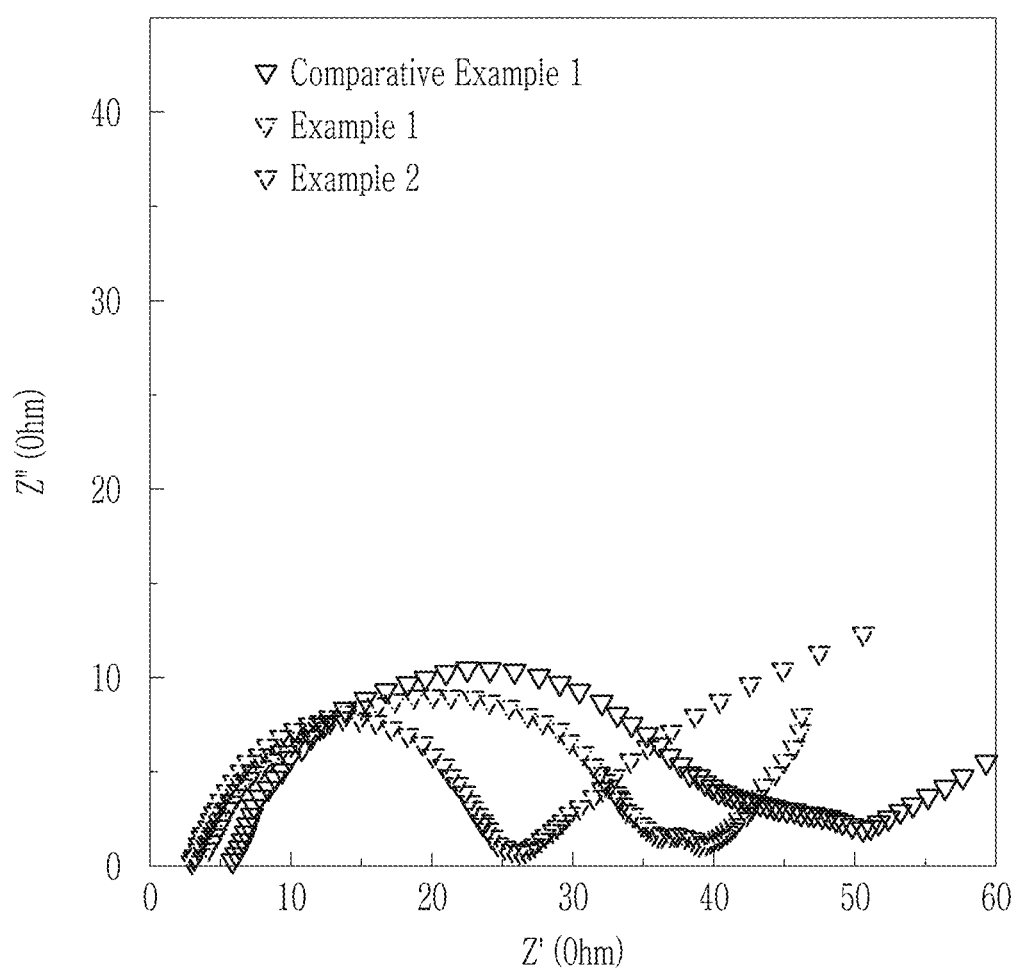
FIG. 5 is a graph showing impedance of the half-cells according to Examples 1 and 2 and Comparative Example 1.
Figure 6:
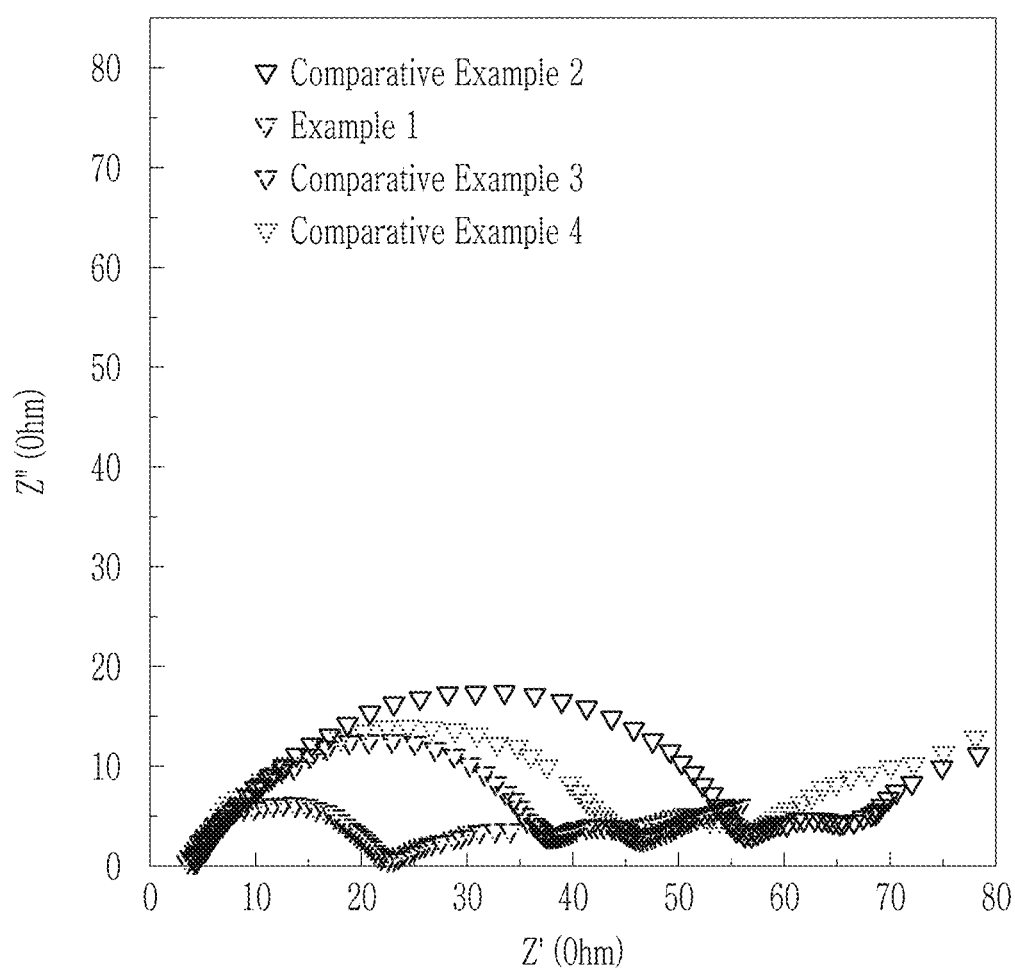
FIG. 6 is a graph showing impedance of the half-cells according to Example 1 and Comparative Examples 2 to 4.

As shown in FIG. 5, the impedance of the half-cells according to Examples 1 and 2 was smaller than that of the half-cell according to Comparative Example 1. In particular, as shown in FIG. 6, the impedance of the half-cell using the negative electrode according to Example 1 was significantly smaller than that of the half-cell according to Comparative Examples 2 to 4.

2) Measurement of Hardness

The hardness of the negative electrodes according to Example 1 and Comparative Examples 2 and 3 was measured by applying force of 30 kgf using a nanoindentation measuring device (available from Rockwell Automation, Inc., product name: VH3300). The measured strength was indentation hardness. The results are shown in FIG. 7.

Figure 7:
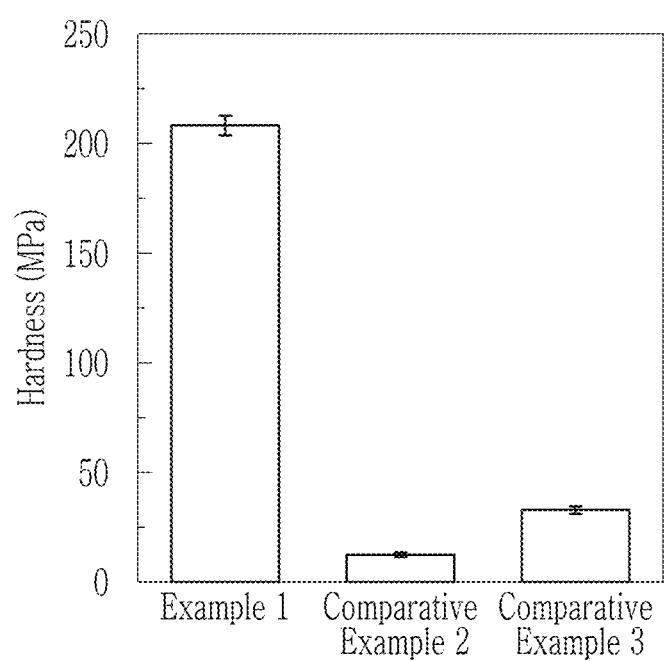
FIG. 7 is a graph showing the strength of negative electrodes according to Example 1 and Comparative Examples 2 and 3.

As shown in FIG. 7, the hardness of the negative electrode according to Example 1 was significantly higher than that of the negative electrodes according to Comparative Examples 2 and 3.

3) Evaluation of Charge and Discharge Efficiency and Cycle-Life Characteristic of the Half-Cell The half-cells according to Examples 1 to 3 and Comparative Examples 1 to 4 were charged and discharged at 0.5 C once, and the charge capacity and the discharge capacity were respectively measured. The results are shown in Table 1. Furthermore, the charge and discharge efficiency, which was a ratio of $1^{st}$ discharge capacity to $1^{st}$ charge capacity, was measured. The results are shown in Table 1.

TABLE 1

|  | Charge capacity (mAh/g) | Discharge capacity (mAh/g) | Charge and discharge efficiency (%) |
|---|---|---|---|
| Example 1 | 2414 | 2100 | 87 |
| Example 2 | 1867 | 1550 | 83 |
| Example 3 | 3023 | 2600 | 86 |
| Comparative Example 1 | 2716 | 2200 | 81 |
| Comparative Example 2 | 2308 | 1800 | 78 |
| Comparative Example 3 | 1975 | 1600 | 81 |
| Comparative Example 4 | 2400 | 1800 | 75 |

It may be seen from Table 1 that the half-cells using the negative active materials according to Examples 1 to 3 exhibited excellent charge and discharge efficiency compared to Comparative Examples 1 to 4.

The half-cells according to Examples 4 to 6 and Comparative Examples 5 to 8 were charged and discharged at 0.5 C 100 times, and a ratio of $100^{th}$ discharge capacity to $1^{st}$ discharge capacity was measured. The results are shown in Table 2, as capacity retention. Furthermore, the charge and discharge efficiency, which was a ratio of $1^{st}$ discharge capacity to $1^{st}$ charge capacity, was measured. The results are shown in Table 2.

TABLE 2

|  | Charge capacity (mAh/g) | Discharge capacity (mAh/g) | Charge and discharge efficiency (%) | Capacity retention (%) |
|---|---|---|---|---|
| Example 4 | 549 | 500 | 91 | 74 |
| Example 5 | 565 | 503 | 89 | 75 |
| Example 6 | 564 | 511 | 91 | 75 |
| Comparative Example 5 | 569 | 504 | 88 | 32 |
| Comparative Example 6 | 583 | 506 | 87 | 47 |
| Comparative Example 7 | 571 | 503 | 88 | 69 |
| Comparative Example 8 | 593 | 506 | 85 | 42 |

As shown in Table 2, the half-cells using the negative active materials according to Examples 4 to 6 exhibited good charge and discharge efficiency compared to Comparative Examples 5 to 8, and in particular, surprisingly excellent capacity retention compared to Comparative Examples 5 to 8.

EXAMPLE 7

98 wt % of a negative active material of a mixture of the negative active material according to Example 1 and artificial graphite (mixing ratio: 9:91 weight ratio), 1 wt % of styrene-butadiene as a binder, and 1 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

96 wt % of a $LiCoO_2$ positive active material, 2 wt % of a polyvinylidene fluoride binder, and 2 wt % of a ketjen black conductive material were mixed in an N-methyl pyrrolidone solvent to prepare a positive active material slurry. The positive active material slurry was coated on an Al current collector, dried, and compressed to prepare a positive electrode.

Using the negative electrode, the positive electrode, and an electrolyte, a rechargeable lithium cell was fabricated. As the electrolyte, a 1.5 M $LiPF_6$ solution in a mixed solvent of ethylene carbonate, dimethyl carbonate, and ethyl methyl carbonate (20:40:40 volume ratio) was used.

EXAMPLE 8

97 wt % of a negative active material of a mixture of the negative active material according to Example 3 and artificial graphite (mixing ratio: 15:85 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

A rechargeable lithium cell was fabricated by the same procedure as in Example 7, except for using the negative electrode.

COMPARATIVE EXAMPLE 9

97 wt % of a negative active material of a mixture of the negative active material according to Comparative Example 1 and artificial graphite (mixing ratio: 13:87 weight ratio), 1.5 wt % of styrene-butadiene as a binder, and 1.5 wt % of carboxymethyl cellulose as an agent for increasing viscosity were mixed in a water solvent to prepare a negative active material slurry. The negative active material slurry was coated on a Cu current collector, dried, and compressed to prepare a negative electrode.

A rechargeable lithium cell was fabricated by the same procedure as in Example 7, except for using the negative electrode.

4) Evaluation of the Cycle-Life Characteristics of Rechargeable Lithium Cell

The rechargeable lithium cells according to Examples 7 and 8 and Comparative Example 9 was charged and discharged at 0.5 C 100 times, and the ratio of $100^{th}$ discharge capacity to $1^{st}$ discharge capacity was measured. The results are shown in Table 3 as capacity retention. Furthermore, the charge and discharge efficiency, which was a ratio of $1^{st}$ discharge capacity to $1^{st}$ charge capacity, was measured. The results are shown in Table 3.

TABLE 3

|  | Initial efficiency (%) | Capacity retention (%) |
|---|---|---|
| Example 7 | 88 | 60 |
| Example 8 | 88 | 56 |
| Comparative Example 9 | 85 | 48 |

It may be seen from Table 3 that the initial efficiency of the cells according to Examples 7 and 8 was slightly higher than in Comparative Example 9, and the capacity retention according to Examples 7 and 8 was surprisingly higher than in Comparative Example 9.

By way of summation and review, some carbon negative materials may have a low capacity of about 360 mAh/g, and a silicon negative active material having a capacity of 2,500 mAh/g or more, which is four or more times higher than the carbon negative active material, have been considered. Silicon has severe volume expansion which may occur during the charging and the discharging (300% relative to graphite), compared to the carbon negative active material, particularly graphite, and it may cause a side reaction with the electrolyte to severely occur, thereby consuming the electrolyte solution and resultantly deteriorating the cycle-life characteristic.

One or more embodiments may provide a negative active material for a rechargeable lithium battery exhibiting excellent initial efficiency and stable cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising:
   a composite including silicon particles, metal particles, and a first amorphous carbon; and
   a second amorphous carbon surrounding on the composite,
   wherein the first amorphous carbon is directly on a surface of the silicon particles.

2. The negative active material as claimed in claim 1, wherein the metal particles are on the surface of the silicon particles.

3. The negative active material as claimed in claim 1, wherein the composite includes:
   the metal particles positioned on the surface of the silicon particles, and
   the first amorphous carbon surrounding the silicon particles and the metal particles.

4. The negative active material as claimed in claim 1, wherein the metal particles include Ni, Ti, Sn, or a combination thereof.

5. The negative active material as claimed in claim 1, wherein the silicon particles have a rod shape, a flake shape, or a spherical shape.

6. The negative active material as claimed in claim 1, wherein:
the silicon particles have a rod shape or a flake shape, and
the silicon particles have an aspect ratio of about 5 to about 20.

7. The negative active material as claimed in claim 1, wherein:
the silicon particles have a spherical shape, and
the silicon particles have a particle diameter of about 5 nm to about 300 nm.

8. The negative active material as claimed in claim 1, wherein the metal particles have a spherical shape.

9. The negative active material as claimed in claim 8, wherein the metal particles have a particle diameter of about 1 nm to about 20 nm.

10. The negative active material as claimed in claim 1, wherein the second amorphous carbon is a continuous layer on the surface of the composite.

11. The negative active material as claimed in claim 1, wherein:
the first amorphous carbon is a hard carbon, and
the second amorphous carbon is a soft carbon.

12. The negative active material as claimed in claim 1, wherein the metal particles are directly on the surface of the silicon particles.

13. A rechargeable lithium battery, comprising:
a negative electrode including the negative active material as claimed in claim 1;
a positive electrode; and
an electrolyte.

14. The negative active material as claimed in claim 1, wherein the metal particles are discontinuously distributed on the surface of the silicon particles as an island form.

15. The negative active material as claimed in claim 1, wherein the metal particles have a particle diameter of greater than 5 nm to 20 nm.

* * * * *